United States Patent Office 2,814,646
Patented Nov. 26, 1957

2,814,646

AMINE ALKYLATION USING ALUMINUM ANILIDE CATALYST

Alfred J. Kolka, Birmingham, George G. Ecke, Ferndale, and Rex D. Closson, Northville, Mich., assignors to Ethyl Corporation, New York, N. Y., a corporation of Delaware No Drawing. Application April 29, 1954,
Serial No. 426,555

11 Claims. (Cl. 260—577)

This invention relates to the alkylation of amines. More particularly, this invention relates to the introduction of organic groups onto the ring of primary and secondary aromatic amines in a position ortho to the amino group.

In the past, aromatic amines have been reacted with olefins in the presence of various metallic anilide catalysts. Various other catalysts such as alkali metals and their hydrides have also been proposed. In each of these cases the alkyl groups have been introduced onto the amino nitrogen. Other methods of alkylation have resulted in the introduction of hydrocarbon groups in the ortho, meta, and para positions on the ring so as to produce a mixture of various isomers. When groups other than alkyl were desired on the aromatic ring, a round-about method of synthesis had to be resorted to. It is thus seen that a valuable contribution to the art would be achieved by a process which would teach a method for the direct introduction of organic groups into the ortho position on the ring of an aromatic amine.

It is, therefore, an object of the present invention to provide a novel process for the introduction of an organic group onto a nuclear carbon atom of an aromatic amine. It is a further object of this invention to provide a novel process for the introduction of an organic group onto a nuclear carbon atom of a primary or secondary aromatic amine comprising reacting said aromatic amine with organic compounds possessing one or more units of carbon-to-carbon unsaturation in the presence of an aluminum anilide-type catalyst. It is also an object of the present invention to provide a process for the introduction of an organic group into the ortho position on the ring of a primary or secondary aromatic amine comprising reacting said aromatic amine with organic compounds possessing one or more units of carbon-to-carbon unsaturation in the presence of an aluminum anilide-type catalyst. A further object of this invention is to provide a process for the introduction of hydrocarbon groups onto the ring of aromatic amines comprising reacting an aromatic amine having at least one hydrogen on the amino nitrogen and also having at least one hydrogen on a nuclear carbon atom ortho to the amino nitrogen group, with a hydrocarbon group possessing at least one olefinic double bond, in the presence of an aluminum anilide-type catalyst. It is likewise an object of our invention to provide new compositions of matter described more fully hereinbelow.

Broadly speaking, the objects of this invention are accomplished by reacting aromatic amines, having at least one hydrogen on the amino nitrogen and also having at least one hydrogen on a nuclear carbon atom ortho to the amino nitrogen group, with an organic compound possessing one or more units of carbon-to-carbon unsaturation in the presence of an aluminum anilide-type catalyst. By "aluminum anilide-type," as used in this writing, is meant an aluminum amide wherein the amine is a primary or secondary aromatic amine in which the nitrogen is joined by a single bond to at least one aromatic carbon atom and wherein the aromatic portion of such amines can be mono- or poly-nuclear and which may or may not have other substituents thereon as described more fully hereinbelow. One decided advantage obtained by utilizing the process of our invention is that substituents are selectively introduced onto the aromatic ring in the position ortho to the amino group.

The aromatic amines that can be used in our process can be mono- or poly-nuclear, and also mono- or poly-amino as, for example, amino benzenes, amino anthracenes, amino naphthalenes, amino phenanthrenes, and the like. The aromatic amines used can also have other substituents such as alkyl, aryl, alkaryl, cycloalkyl, substituted cycloalkyl, halogen, alkoxy and aryloxy on the aromatic ring. Illustrative examples of such aromatic amines are given hereinbelow. Of the various aromatic amines, we prefer to utilize those possessing one ring, or two or three condensed rings in the nuclear portion of the molecule. In particular, we prefer to use amino benzenes as one of our reactants.

The organic compounds possessing carbon-to-carbon unsaturation which are employed in carrying out the process of this invention can be mono- or poly-olefins (including mixtures of olefins), cyclo-olefins, and aryl substituted olefins. They can also be other compounds bearing carbon-to-carbon double bonds so long as they are not adversely reactive towards the aromatic amine or the catalyst used. Illustrative examples of such other compounds are unsaturated amines and ethers. We prefer to use organic compounds possessing carbon-to-carbon unsaturation having from two to about twenty carbon atoms. Of the various possible unsaturated compounds we prefer to use the olefinic hydrocarbons. Of the olefins we especially prefer those of lower molecular weight as, for example, ethylene, propylene, the various butylenes and the like, up to olefins containing about twelve carbon atoms such as dodecene, although olefins of higher molecular weight up to and including those containing about twenty carbon atoms such as eicosene can also be used.

As catalysts in the process of this invention aluminum derivatives of aniline-type compounds in general can be utilized. That is, the catalyst is of the aluminum anilide-type wherein the aromatic portion of the catalyst molecule can be the same as or different from that of the aromatic amine that is being alkylated or substituted with an organic group of the type mentioned above. In general, the catalyst can be prepared from any of the aromatic amines that can be used in our process as mentioned hereinabove. Mixtures of the various aluminum anilide-type catalysts can also be used.

The catalyst can be prepared in a number of ways. One method is to react an aromatic amine directly with aluminum metal to form the aluminum anilide-type compound of that amine. Another method is to react an alkali or alkaline earth metal anilide-type compound with an aluminum halide as, for example, the reaction of sodium anilide with aluminum chloride to form the aluminum anilide catalyst, or, the reaction of calcium naphthyl amide with aluminum chloride to form the aluminum naphthyl amide catalyst. Still another method is to react aniline-type compounds with aluminum alkyls such as triethyl aluminum, or with aluminum amide compounds such as Al(NH$_2$)$_3$, or with lithium aluminum hydride, to form the aluminum anilide-type catalyst. Also, an aniline-type compound can be reacted with aromatic sodium compounds and aluminum chloride to give the aluminum anilide-type catalysts. It is thus seen that there are many ways in which the catalyst used in the process of this invention can be prepared. Methods other than those mentioned above will be apparent to one skilled in the art. The requirement is that the catalyst as used in our process be in the form of an aluminum anilide-type compound as defined above. While the catalyst can be prepared by a variety of methods, we prefer to prepare it by reacting a primary or secondary amine directly with the aluminum metal.

The catalyst can be preformed or prepared in situ. However, there are certain advantages in utilizing a preformed catalyst. One such advantage is that there is no hydrogen given off during the course of the substitution reaction. Another advantage of using a preformed catalyst is that greater partial pressures of gaseous reactants can be obtained since no volume is taken up by the liberated hydrogen. Therefore, while the catalyst can be prepared in situ and in some cases there is no objection to so doing, in general we prefer to prepare the catalyst prior to the addition of the substitution agent. It is noted that when the process of this invention is carried out at atmospheric pressures, there is usually no preference as to how the catalyst is prepared.

The amount of catalyst used is dependent to some extent upon the pressure at which the reaction is conducted, the reactivity of the reagents, and the activity of the catalyst. At higher temperatures somewhat smaller amounts of catalysts can be used than are preferable at lower temperatures. Generally, the amount of aluminum anilide-type catalyst used should be between about 0.01 and 30 percent by weight of the amount of aromatic amine used. We prefer to employ from about 0.1 to about 20 percent of catalyst based on the weight of the aromatic amine used as it is found that this amount of catalyst produces a satisfactory rate of reaction. However, greater amounts of catalyst can be used.

In utilizing the novel processes of this invention we have been able to obtain new and unusual compositions of matter. This has become possible due to the ease with which organic substituents can be introduced into the ortho position on the ring of aromatic amines by this method.

A new class of compounds synthesized by utilizing the present process has the formula

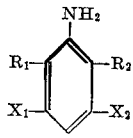

wherein $R_1$ is an aliphatic hydrocarbon group which can be primary, secondary or tertiary, that is, it can be either straight or branched chain, or cyclic, having from one to about twenty carbon atoms; $R_2$ can be an ethyl group or a secondary or tertiary aliphatic hydrocarbon group having at least two adjacent aliphatic carbon atoms one of which is attached by a single bond to the nuclear carbon atom of the aromatic amine, and which can be either branched chain, cyclic, or substituted cyclic having from two to about twenty carbon atoms, and wherein $R_1$ and $R_2$ can also have aryl and alkaryl substituents thereon. $X_1$ and $X_2$ can be the same or different and can be hydrogen, aliphatic hydrocarbon groups containing from one to about twenty carbon atoms, alkoxy groups, and halogen such as chlorine, bromine, fluorine and iodine. The compounds can be prepared by reacting an aromatic amine with an olefin in the presence of an aluminum anilide-type catalyst. Illustrative examples of the product compounds of this class are: 2-methyl-6-ethyl aniline obtained by the reaction of o-toluidine with ethylene in the presence of an aluminum anilide-type catalyst such as aluminum toluidide; 2,6-diethyl aniline which can be prepared by the reaction of aniline with ethylene in the presence of an aluminum anilide catalyst and which can also be prepared by the reaction of o-ethyl aniline with ethylene in the presence of an aluminum anilide-type catalyst such as aluminum o-ethyl anilide; 2-ethyl-6-isopropyl aniline which can be prepared by the reaction of aniline with ethylene in the presence of an aluminum anilide catalyst to form o-ethyl aniline which can then be further reacted with propylene in the presence of an aluminum anilide catalyst such as aluminum anilide or aluminum o-ethyl anilide to form the 2-ethyl-6-isopropyl aniline, an alternative being to react aniline first with propylene and then take the o-isopropylaniline and react it with ethylene to get the same product; 2,5-dimethyl-6-ethyl aniline which can be prepared by the reaction of 2,5-dimethyl aniline with ethylene in the presence of an aluminum anilide catalyst; 2-methyl-5,6-diethyl aniline which can be prepared by the reaction of 2-methyl-5-ethyl aniline with ethylene in the presence of an aluminum anilide-type catalyst such as aluminum 2-methyl-5-ethyl anilide; 2-ethyl-3-bromo-6-isopropyl aniline which can be prepared by the reaction of 3-bromo aniline with ethylene in the presence of an aluminum anilide-type catalyst such as aluminum 3-bromo anilide to form 2-ethyl-3-bromo aniline which can then be reacted with propoylene in the presence of an aluminum anilide-type catalyst to produce the 2-ethyl-3-bromo-6-isopropyl aniline; 2,6-diethyl-3-chloro aniline which can be prepared by the reaction of 3-chloro aniline with ethylene in the presence of an aluminum anilide-type catalyst such as, for example, aluminum 3-chloro anilide; 2-ethyl 6(2-decyl)aniline which can be prepared by the reaction of o-ethyl aniline with decene-1 in the presence of an aluminum anilide-type catalyst; 2,6-diethyl-3-methoxy aniline which can be obtained by the reaction of 3-methoxy aniline with ethylene in the presence of an aluminum anilide-type catalyst such as, for example, aluminum 3-methoxy anilide; and the like.

These compounds have the unexpected property that unlike other aromatic amines wherein alkyl groups on the ring increase the basicity of the nitrogen, the alkyl groups in the 2 and 6 positions cause the amine to be less reactive. It is thus possible to effect certain reactions involving the para position without effecting the $NH_2$ group. One of the uses of the compounds of this class is as HCl scavengers in chlorine-containing polymers, such as polyvinyl chloride polymers, thus inhibiting the deterioration of the polymer. Another utility of these compounds is in the synthesis of oil-soluble dyes, the solubility in oil being accomplished by the alkyl groups in the 2 and 6 positions, the number of carbon atoms in which can be varied to suit the particular purpose in mind. The members of this class also serve as intermediates in the syntheses of compounds possessing anesthetic properties.

Another new class of compounds synthesized by our process has the formula

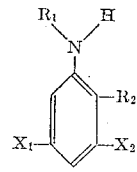

$R_1$ is a methyl or ethyl group. $R_2$ is an ethyl group or secondary aliphatic hydrocarbon group having at least two adjacent aliphatic carbon atoms one of which is attached by a single bond to the nuclear carbon atom of the aromatic amine and which contains from three to about twenty carbon atoms and can be branched chain, cyclic, or substituted cyclic, and wherein $R_2$ can also contain aryl and alkaryl substituents thereon. $X_1$ and $X_2$ can be the same or different and can be hydrogen; aliphatic hydrocarbon groups containing from one to about twenty carbon atoms which can be either straight chain, branched chain, cyclic or substituted cyclic; alkoxy groups; and halogen such as fluorine, chlorine, bromine and iodine. The compounds can be prepared by reacting the proper aromatic amine with an olefin in the presence of an aluminum anilide-type catalyst. Illustrative examples of compounds of this class are: 2-ethyl-N-methyl aniline which can be obtained by the reaction of N-methyl aniline with ethylene in the presence of an aluminum anilide-type catalyst such as aluminum N-methyl anilide, 2-ethyl-N-ethyl aniline which can be obtained by the reaction of N-ethyl aniline with ethylene in the presence of an aluminum anilide-type catalyst, 2-ethyl-3-chloro-N-methyl aniline which can be obtained by the reaction of 3-chloro-N-methyl aniline with ethylene in the presence of an aluminum anilide-type catalyst such as aluminum 3-chloro-N-methyl anilide, 2-ethyl-5-bromo-N-ethyl aniline which can be obtained by the reaction of 5-bromo-N-ethyl aniline with ethylene in the presence of an aluminum anilide-type catalyst, 2 - isopropyl - 5 - methyl-N-methyl aniline which can be obtained by the reaction of 5-methyl-N-methyl aniline with propylene in the presence of an aluminum anilide-type catalyst such as aluminum 5-methyl - N - methyl anilide, 2(2 - decyl)3-ethyl-N-ethyl aniline which can be obtained by the reaction of 3-ethyl-N-ethyl aniline with decene-1 in the presence of an aluminum anilide-type catalyst, 2-ethyl-5-methoxy-N-methyl aniline which can be obtained by the reaction of 5-methoxy-N-methyl aniline with ethylene in the presence of an aluminum anilide-type catalyst such as aluminum 5-methoxy-N-methyl anilide.

One unusual property of the compounds of this class is that they form organic acid amides which are liquids at ordinary temperatures, that is, they have very low melting points. As one consequence of this property it is found that such amides serve as very good plasticizers. The compounds of this class are useful in medicine as antiseptics. They are also useful in the preparation of dyes, detergents, resins, etc. Other uses are as antioxidants, water-proofing agents, vulcanization rate controllers, and the like.

In general, the process of our invention is carried out by reacting a primary or secondary aromatic amine, such as aniline, for example, with an organic group possessing carbon-to-carbon unsaturation as, for example, ethylene or allyl amine, in the presence of an aluminum anilide-type catalyst to produce ortho substituted aromatic amines. When an olefin is used the process can be referred to as alkylation. When alkylating aromatic amines with a highly volatile or gaseous alkylating agent such as ethylene, the reaction should be conducted at elevated pressures in order to obtain a sufficient concentration of the gaseous reactant to produce a practical rate of reaction. The invention will be more fully understood by reference to the following set of illustrative examples in which the percentage conversion is calculated on the basis of the amount of aromatic amine charged to the reaction vessel, and the percentage yield is calculated on the basis of the amount of aromatic amine recovered at the end of the reaction.

*Example I* o-Ethylaniline—*Preparation of catalyst.*—A reaction vessel equipped with means for charging and discharging of fluids and solids, and having a number of gas inlet and outlet lines, temperature reading devices, means for refluxing liquids, and fitted with a mechanical agitator, was flushed with argon at elevated temperature in order that all oxygen and moisture be removed from the vessel. To this reaction vessel, while maintaining the flow of argon, was added 5 parts of aluminum turnings and 200 parts of aniline. The flow of argon was continued during the following steps. The reaction vessel was next slowly heated and at 148° C., vigorous evolution of hydrogen gas was noted indicating the commencement of a reaction between the aniline and aluminum to form aluminum anilide. At this point, the heating was discontinued and the argon flow shut off. The temperature rose to 150° C. during the reaction. After about 15 minutes the rate of the evolution decreased and the temperature began to drop. When hydrogen ceased to be evolved, the flow of argon was resumed. Heat was applied, and the temperature maintained at 150° C. for an additional 30 minutes to insure complete reaction between the aluminum and the aniline. Following this the agitation was discontinued and the reaction mixture allowed to cool. When the reaction mixture containing the aluminum anilide had cooled to 25° C. it was ready for charging to the pressure resistant vessel in which the alkylation reaction was carried out.

*Ethylation of aniline.*—A pressure resistant vessel having a removable cap for charging and discharging liquids and solids, equipped with a plurality of gas inlet and outlet lines, temperature measuring devices, pressure gauges, and fitted with a mechanical agitator was flushed with argon and charged with the mixture containing the aluminum anilide catalyst which had been prepared as described above, without exposure to the atmosphere. Care was exercised to make certain that there was a continuous flow of argon through the pressure resistant vessel at the time that the catalyst was being charged to it, and also that there was a flow of argon through the vessel containing the catalyst during the period of said charging in order that the mixture be not exposed to oxygen of the atmosphere at any time. The pressure resistant reaction vessel was next charged with 400 parts by weight of aniline, the vessel clamped shut and the flow of argon discontinued. The reaction vessel was heated to 185° C. and was then pressurized to 33 atmospheres with ethylene and the heating continued. A pressure drop was observed at about 325° C., indicating the beginning of the alkylation reaction. The reactants were maintained at 330° C. and as the pressure dropped more ethylene was admitted so as to keep the pressure in the vessel at about 40–54 atmospheres. When an amount of ethylene equivalent to a pressure drop of 60 atmospheres had reacted the heating was discontinued and the reaction vessel and its contents allowed to cool. When the temperature had reached 25° C., 200 parts of water were added in order to hydrolyze the aluminum anilide compound. The solid aluminum hydroxide was filtered off and the liquid subjected to fractional distillation. The product consisted of 458 parts of recovered aniline, 130 parts of o-ethylaniline boiling at 209–210° C. and 10 parts of 2,6-diethyl-aniline boiling at 235–236° C. No other products were detected. There was no evidence of material boiling at 204° C., which is the boiling point of N-ethylaniline. An acetyl derivative of the o-ethylaniline melted at 111–112° C., and a phenyl-thiourea derivative melted at 120–120.5° C. (Melting points reported in the literature, 113° C. and 124° C., respectively.) The infra-red spectrum of the o-ethylaniline confirmed it to be a primary amine. Nitrogen analysis showed 11.4 percent N (calculated, 11.6 percent N).

The infra-red spectrum of the 2,6-diethylaniline confirmed it to be a primary amine also. Its refractive index was $n_D^{20}$ 1.5461. A nitrogen analysis of the compound showed 9.9 percent N (calculated, 9.4 percent N).

Both the o-ethylaniline and the 2,6-diethylaniline were clear and colorless liquids.

When the reaction described in this example is carried out at higher temperatures, that is, temperatures ranging up to about 400° C., higher conversions of aniline to the o-ethyl aniline and 2,6-diethylaniline are obtained when sufficient ethylene is employed. Temperatures higher than 400° C. can also be used.

*Example II*

2-ethyl-6-methylaniline—*Catalyst.*—The aluminum o-methyl-anilide catalyst was prepared in a manner similar to that given for the preparation of aluminum anilide in Example I, by heating 600 parts of o-toluidine with 9 parts of aluminum turnings. The same precautions with respect to keeping out oxygen, etc., were observed as in Example I. Hydrogen was vigorously evolved at 185° C. and the reaction was complete in approximately fifteen minutes.

*2-ethyl-6-methylaniline.*—The reaction mixture containing the catalyst was charged to a pressure resistant vessel in a manner similar to that described in Example I and an additional 600 parts of o-toluidine were added and the vessel pressurized with ethylene. A pressure drop was noted at 320° C. As the pressure dropped ethylene was introduced to keep the pressure at 40–55 atmospheres. The reaction was allowed to proceed for a total of 8 hours. At the end of this time the reaction vessel and its contents were allowed to cool to 25° C., 200 parts of water were added and the solid aluminum hydroxide separated from the liquid products. The product was subjected to fractional distillation and yielded 679 parts of 2-methyl-6-ethylaniline (89.8 percent conversion and yield), boiling at 224° C. at atmospheric pressure and having an index of refraction of 1.5523 $n_D^{20}$. The infra-red spectrum of the material indicated it to be a primary amine. Nitrogen analysis showed 10.6 percent N (calculated 10.4 percent N). The acetyl derivative of 2-methyl-6-ethylaniline was found to melt at 126.5–127.5° C. and an analysis for nitrogen showed this derivative to contain 9.07 percent N (calculated, 8.75 percent N).

No other compound was detected among the products of this reaction.

*Example III*

*Ortho-isopropyl aniline.*—The aluminum anilide catalyst was prepared as in Example I utilizing 9 parts of aluminum and 600 parts of aniline. The reaction mixture containing the catalyst was charged to a pressure resistant vessel as in Example I and an additional 600 parts of aniline added. The vessel was pressurized with propylene to a pressure of 27 atmospheres at 238° C., then heated further and the reaction carried out at a temperature of 320–330° C. and in a pressure range of 40–50 atmospheres. A pressure drop of 7 atmospheres was observed over a five-hour period. The product was hydrolyzed, separated from the aluminum hydroxide precipitate, and subjected to fractional distillation. Thirty-seven parts of o-isopropyl aniline (4.25 percent conversion, 22.2 percent yield), were obtained. The o-isopropylaniline boiled at 217–218° C. and had a refractive index of 1.5483 $n_D^{20}$. The infra-red spectrum indicated it was a primary amine. Four derivatives of this compound were prepared. The phenylthiourea derivative melted at 134.5–135.5° C., the hydrochloride melted at 182–185° C., the picrate decomposed at 159–161° C., and an acetyl derivative melted at 71–72° C. (the literature values reported for the melting points are 129–130° C., 182° C., 160° C. and 72° C. respectively).

*Example IV*

*o-Tert-butylaniline—Preparation of catalyst.*—The catalyst was prepared in a manner similar to that given in Example I except that it was prepared in the pressure resistant vessel used in the alkylation, thus eliminating the step of transferring the catalyst-containing mixture from another container into the reaction vessel.

The pressure resistant vessel was flushed with prepurified nitrogen (oxygen-free nitrogen), at elevated temperature in order that all oxygen and moisture be removed therefrom. To this vessel were then added 5 parts of aluminum turnings and 600 parts of aniline. The oxygen-containing atmosphere was flushed from the vessel with a stream of pre-purified nitrogen and the vessel was then closed tightly and heated. Evolution of hydrogen was evidenced at 220° C. by a rise in pressure. The reaction was complete in a short period of time and the vessel and contents cooled to 57° C., at which temperature the excess hydrogen was vented, and the procedure described below followed.

*o-Tert-butylaniline.*—After the excess hydrogen had been vented, the reaction vessel was closed again, heated to 169° C., pressurized to 16 atmospheres with isobutylene and the temperature increased to 332° C., at which point a pressure drop was noted from 48 atmospheres to 47 atmospheres. The reaction vessel and its contents were then cooled to 25° C., the product hydrolyzed and the liquid product fractionated by distillation to yield 546 parts of recovered aniline and 13 parts of o-tert-butylaniline distilling at 227–228° C. Infra-red spectrum confirmed the latter to be a primary amine. An acetyl derivative melted at 161.5 to 162.5° C. (literature, 159–161° C.).

*Example V*

*2-ethyl-1-naphthylamine.*—The catalyst was prepared in a manner similar to that given in Example IV, in the pressure resistant vessel. Aluminum turnings, 4.5 parts, were heated with 513 parts of 1-naphthyl amine to a temperature of 270° C. and maintained at that point for a period of 45 minutes. The reaction vessel was next cooled, the hydrogen vented and the reaction vessel closed and heated again to 150° C. Ethylene was then admitted raising the pressure to 27 atmospheres. The reaction vessel was further heated to 300° C., when a drop in the ethylene pressure was noted. A total drop of 30 atmospheres was recorded while maintaining the reaction pressure at 40–54 atmospheres over a three-hour period. Hydrolysis and fractional distillation of the product mixture yielded 250 parts of recovered 1-naphthyl amine and 181 parts of 2-ethyl-1-naphthyl amine, corresponding to 29.5 percent conversion based on the initial amount of 1-naphthyl amine present, and a 57.7 percent yield based on the amount of amine unrecovered.

The 2-ethyl-1-naphthyl amine had a boiling range of 189–190° C. at 20 millimeters pressure of mercury and a refractive index of 1.6474 $n_D^{25}$. Nitrogen analysis showed 8.22 percent N (calculated, 8.18 percent N). The acetyl derivative of the product melted at 155–156.5° C. (literature, 156.5° C.).

No other products were detected.

*Example VI*

*2-ethyl-N-methylaniline.*—The catalyst for this run was prepared in the manner similar to that used in Example IV by reacting aluminum turnings with N-methylaniline.

A total of 592 parts of N-methylaniline was charged to the pressure resistant vessel and reacted with ethylene in the presence of aluminum N-methyl anilide at a temperature of 200–210° C. and at a pressure of 40–54 atmospheres for a period of three hours. An amount of ethylene equivalent to a pressure drop of 140 atmospheres were reacted. Upon hydrolyzation and fractional distillation there was obtained 602 parts of N-methyl-o-ethylaniline, 86 percent conversion based on the amount of N-methyl aniline used.

The N-methyl-o-ethylaniline distilled at 216.5° C. and had a refractive index of 1.5553 $n_D^{20}$. Infra-red spectrum indicated it to be a secondary amine. Nitrogen analysis showed 10.9 percent N, calculated, 10.4 percent N. A m-nitrobenzene sulfonamide derivative melted at 133.5–134° C. Nitrogen analysis of this derivative showed 9.07 percent N, calculated 8.75 percent N.

*Example VII*

*2-isopropyl-N-methylaniline.*—The procedure of Example VI was repeated using propylene in place of ethylene. Five hundred and ninety-two parts of N-methylaniline were reacted with propylene in the presence of aluminum N-methylanilide at a temperature of 235° C. and a pressure of 34–47 atmospheres. An amount of propylene equivalent to a pressure drop of 67 atmospheres was reacted over a period of four hours. In order to obtain the high pressure of propylene, the propylene cylinder was heated, observing the necessary safety precautions. The product from the reaction vessel upon hydrolyzation and fractionation yielded 194 parts of recovered N-methylaniline and 455 parts of N-methyl-o-isopropyl aniline (55.3 percent conversion, 80 percent yield based on the amount of N-methylaniline consumed).

The N-methyl-o-isopropylaniline boiled at 224° C. and had a refractive index of 1.5460 $n_D^{20}$. Infra-red spectrum indicated it to be a secondary amine. Nitrogen analysis showed 9.55 percent N, calculated 9.38 percent N. A m-nitrobenzene sulfonamide derivative melted at 103–104.5° C. The nitrogen analysis for this derivative showed 8.43 percent N, calculated 8.38 perment N.

*Example VIII*

N - methyl - 2 - (2 - decyl)aniline.—The aluminum N-methylanilide catalyst was prepared in the pressure resistant vessel in a manner similar to the preparation of the aluminum anilide catalyst described in Example IV. A total of 300 parts of N-methylaniline were reacted with 232 parts of decene-1 in the presence of the aluminum N-methyl anilide catalyst in the pressure resistant vessel at a temperature of 300° C. for one hour. The product was hydrolyzed and fractionated to yield 140 parts of N-methyl-o-(2-decyl)aniline (35 percent conversion, 96 percent yield based on the N-methylaniline consumed).

The alkylated product boiled at 138° C. at a pressure of 2 millimeters of mercury and had a refractive index of 1.5134 $n_D^{20}$. Infra-red spectrum indicated the product to be a secondary amine. Nitrogen analysis showed 6.0 percent N (calculated for N - methyl-o-(2-decyl)aniline, 5.7 percent N).

*Example IX*

N-methyl-2-cyclohexylaniline.—A total of 428 parts of N-methylaniline was reacted with 168 parts of cyclohexene in a pressure resistant vessel in the presence of aluminum N-methylanilide catalyst which had been prepared in a manner similar to that described in Example IV. The reactants were slowly heated to a temperature of 300° C. The reaction product was then cooled, the mixture hydrolyzed and fractionated to yield 5.8 parts of N-methyl-o-cyclohexylaniline (1.5 percent conversion, 7.5 percent yield based on the amount of N-methylaniline consumed).

The N-methyl-o-cyclohexylaniline boiled at 112–117° C. at a pressure of 2 millimeters of mercury and had a refractive index of 1.5644 $n_D^{20}$. The infra-red spectrum indicated this material to be a secondary amine. Nitrogen analysis showed 7.6 percent N, calculated 7.4 percent N.

*Example X*

Ortho - ethyl - N-ethylaniline.—The catalyst was prepared in a manner similar to that described in Example I by reacting 300 parts of N-ethylaniline with 4.5 parts of aluminum turnings. The mixture was refluxed for one hour and thirty minutes to insure complete reaction.

The catalyst was charged to the pressure resistant vessel in the manner described in Example I and an additional 300 parts of N-ethylaniline were added. The vessel was then heated to 190° C. and pressurized to 27 atmospheres with ethylene. Alkylation was carried out in the temperature range of 204–208° C. and an amount of ethylene equivalent to a total pressure drop of 97 atmospheres was reacted. The reaction mixture was cooled, hydrolyzed and fractionated to yield 576 parts (84 percent conversion, 88 percent yield based on the amount of N-ethylaniline consumed), of N-ethyl-o-ethylaniline. There was no product boiling in the range of aniline or o-ethylaniline.

The N-ethyl-o-ethylaniline boiled at 223° C. and had a refractive index of 1.5398 $n_D^{20}$. Nitrogen analysis showed 9.6 percent N, calculated 9.4 percent N. The infra-red spectrum agreed with the spectrum of N-ethyl-o-ethylaniline which was prepared as described below.

No other alkylation products were detected.

*Proof of structure.*—A mixture of 106 parts of o-ethylaniline, obtained as described in Example I, and 99 parts of potassium carbonate were heated with 156 parts of ethyl iodide at reflux temperature for one hour. After washing with potassium hydroxide and water, the organic layer was separated and distilled. A total of 57.9 parts (44.4 percent conversion) of N-ethyl-o-ethylaniline boiling at 117–117.5° C. at 20 millimeters of mercury was obtained. The refractive index was 1.5398 $n_D^{20}$, which is the same as that of the compound described in the previous paragraph. Nitrogen analysis showed 9.2 percent N, calculated 9.4 percent N. The infra-red spectrum indicated this material to be the same as that obtained by the ethylation of N-ethylaniline as described above.

To further demonstrate the identity of the two samples of N-ethyl-o-ethylaniline, a m-nitrobenzenesulfonyl derivative was prepared from each. The melting point of the derivative from the ethylation product was 117.5–118° C. as compared with 116–117° C. for the derivative of the synthesized product. The mixed melting point was 116–118° C. A benzoyl derivative also was prepared of each of the N-ethyl-o-ethylanilines. The melting points were 46.5 to 48° C. for one and 47.5 to 49° C. for the other. The mixed melting point was 46.5 to 48.5° C.

*Example XI*

N-ethyl-2-ethyl-3-chloroaniline, N-ethyl - 2 - ethyl - 5-chloroaniline.—N-ethyl-3-chloroaniline was prepared by heating 2000 parts of m-chloroaniline to 150° C. then slowly adding 870 parts of ethyl bromide. After this reaction was completed 340 parts of sodium hydroxide in 550 parts of water was slowly added to the above with rapid agitation. The aqueous layer was separated off, the organic layer was washed with water and then 250 parts of benzene added and the mixture azeotropically distilled until all the water was removed. The organic layer was fractionally distilled through a packed column and 834 parts of n-ethyl-3-chloroaniline, boiling at 247–249° C. and having an index of 1.5671 $n_D^{20}$ was obtained.

The aluminum anilide catalyst of the N-ethyl-3-chloroaniline was prepared in a manner similar to that described in Example IV.

N-ethyl - 2 - ethyl - 3 - chloroaniline and N - ethyl - 2-ethyl - 5 - chloroaniline.—A total of 400 parts of N-ethyl-3-chloroaniline was reacted at 250–260° C. with ethylene in the presence of the aluminum N-ethyl-3-chloroanilide catalyst at a pressure of 40–55 atmospheres. An amount of ethylene corresponding to a pressure drop of 67 atmospheres was consumed in the reaction. The product was hydrolyzed and fractionated to yield 238 parts of N-ethyl-2-ethyl-3-chloroaniline (45 percent conversion), boiling at 150.5–151.5° C. at a pressure of 30 millimeters of mercury and having a refractive index of 1.5556 $n_D^{20}$, and 212 parts of N-ethyl-2-ethyl-5- chloroaniline (40 percent conversion), boiling at 157.5 to 158.2° C. at a pressure of 30 millimeters of mercury, refractive index 1.5544 $n_D^{20}$. Infra-red spectrum indicated the products were secondary amines.

*Proof of structure.*—In order to positively identify the above isomers, an independent synthesis was performed in the manner described below.

Ethylbenzene was chlorinated and then the p-chloroethylbenzene isomer separated (boiling point 182.1° C., refractive index 1.5174 $n_D^{20}$). The p-chloroethylbenzene was nitrated and two mononitro isomers were separated. The 2-nitro-p-chloroethylbenzene, boiling at 147° C. at a pressure of 30 millimeters of mercury and having a refractive index of 1.5518 $n_D^{20}$ was identified by oxidation to the corresponding 2-nitro-4-chlorobenzoic acid which melted at 141–142° C. (literature, 140–141° C.). The 3-nitro-4-chloroethylbenzene boiling at 162.3° C. at a pressure of 30 millimeters of mercury and having a refractive index of 1.5499 $n_D^{20}$ was identified in a similar manner by conversion to 3 - nitro - 4 - chlorobenzoic acid which melted at 180–181.5° C. (literature, 180° C.). Next, the 2-nitro-4-chloroethylbenzene was reduced with stannous chloride and hydrochloric acid to 2-ethyl-5-chloroaniline, boiling at 155° C. at a pressure of 33 millimeters of mercury and having a refractive index of 1.5742 $n_D^{20}$. The 2-ethyl-5-chloroaniline was reacted with acetic anhydride to produce an acetyl derivative which melted at 140–141° C. The acetyl derivative was reduced with lithium aluminum hydride to produce N-ethyl-2-ethyl-5-chloroaniline boiling at 157° C. at a pressure of 26 millimeters of mercury and having a refractive index of 1.5552 $n_D^{20}$. A hydrochloride of the N-ethyl-2-ethyl-5-chloroanaline was obtained upon reaction with concentrated hydrochloric acid which was in the form of a solid melting at 115–116° C. The mixed melting point of this material with the hydrochloride of the lower boiling isomer from the ethylation of N-ethyl-3-chloroaniline was 93–110° C., while the mixed melting point with hydrochloride of the higher boiling isomer was 114.5–115.5° C. The infra-red spectrum of the synthesized N-ethyl-2-ethyl-5-chloroaniline was identical with that of the higher boiling isomer obtained from the ethylation of N-ethyl-3-chloroaniline. Therefore, it is seen that the higher boiling isomer obtained from the ethylation of N-ethyl-3-chloroaniline is N-ethyl-2-ethyl-5-chloroaniline. The lower boiling isomer is, therefore, N-ethyl-2-ethyl-3-chloroaniline.

In general, the process of this invention can be carried out at temperatures ranging from 50 to about 500° C. and at pressures of from less than one atmosphere to about 3000 atmospheres or higher. The optimum temperature and pressure of a particular reaction depends on the reagents that are being reacted. For example, when alkylating N-methylaniline with ethylene the temperature required is over 100 degrees lower than that employed when aniline is alkylated with ethylene. It is also seen that when a compound such as ethylene is one of the reactants, pressures above atmospheric are preferably employed in order to increase the concentration of the highly volatile component. On the other hand, when the unsaturated compound used in the process of this invention has a low vapor pressure as in the case of Example VIII where N-methylaniline is reacted with decene-1, the reaction can be elegantly conducted at the vapor pressure of the system.

It was stated above that the aromatic amines that can be used in carrying out the process of this invention can be mono- or poly-nuclear and mono- or poly-amino and that they may or may not have other substituents on the ring, the requirement being that there be a position ortho to the amino group available for substitution. It was also stated that the aromatic amine can be either primary or secondary, that is, it need only have one replaceable hydrogen on the nitrogen. Non-limiting examples of such aromatic amines are; aniline, o-toluidine, m-toluidine, p-toluidine, o-ethylaniline, m-ethylaniline, o-anisidine, m-anisidine, p-anisidine, p-phenetidine, o-chloroaniline, m-chloroaniline, p-chloroaniline, m-bromoaniline, 3,5-dichloroaniline, N-methylaniline, N-methylanisidine, N-ethylaniline, N-ethyl-m-toluidine, phenylenediamine, diphenylamine, benzidine, N-methyl-m-chloroaniline, N-butyl-p-chloroaniline, naphthylamine, 3-ethyl-1-naphthylamine, N-methyl-1-naphthylamine, anthrylamine, N-isopropylanthrylamine.

Illustrative examples of the unsaturated compounds that can be used to introduce organic groups onto the aromatic nucleous are; ethylene, propylene, butylene, isobutylene, cyclohexene, dodecene, eicosene, isoprene, styrene, vinylethyl ether, divinyl ether, crotonylphenyl ether, allyl amine, crotonyl amine, 5-aminopentene-1.

Non-limiting examples of products that can be obtained by our process in addition to those given in the illustrative examples above are; 2-isopropyl-6-tert-butyl aniline which can be obtained by the reaction of aniline with propylene in the presence of aluminum anilide as catalyst to produce 2-isopropyl aniline which can then be further reacted with isobutylene in the presence of an aluminum anilide-type catalyst to form 2-isopropyl-6-tert-butyl aniline, 2-sec-decyl aniline which can be obtained by the reaction of aniline with decene-1 in the presence of an aluminum anilide-type catalyst, 2,3-diethyl aniline which can be obtained by the reaction of 3-ethyl aniline with ethylene in the presence of an aluminum anilide-type catalyst such as aluminum 3-ethyl anilide, 2-ethyl-3-chloro aniline which can be obtained by the reaction of 3-chloro aniline with ethylene in the presence of an aluminum anilide-type catalyst such as aluminum 3-chloro anilide, 2-tert-butyl-5-bromo aniline which can be obtained by the reaction of 5-bromo aniline with isobutylene in the presence of an aluminum anilide-type catalyst, 2-ethyl-3-methyl-1-naphthyl amine which can be obtained by the reaction of 3-methyl-1-naphthyl amine with ethylene in the presence of a catalyst such as aluminum 3-methyl-1-naphthyl amide, 2-isopropyl-3-chloro-1-naphthyl amine which can be obtained by the reaction of 3-chloro-1-naphthyl amine with propylene in the presence of an aluminum anilide-type catalyst such as aluminum 3-chloro-1-naphthyl amide, 2,5-diethyl-N-ethyl aniline obtained by the reaction of 5-ethyl-N-ethyl aniline with ethylene in the presence of an aluminum anilide-type catalyst such as aluminum 5-ethyl-N-ethyl aniline, 2-ethyl-3-bromo-N-ethyl aniline which can be obtained by the reaction of 3-bromo-N-ethyl aniline with ethylene in the presence of an aluminum anilide-type catalyst such as aluminum 3-bromo-N-ethyl anilide, 2-isopropyl-N-amyl aniline which can be obtained by the reaction of N-amyl aniline with propylene in the presence of an aluminum anilide-type catalyst; 2 - ethyl - 8 - chloro-N-methyl-1-naphthyl amine which can be obtained by the reaction of 8-chloro-N-methyl-1-naphthyl amine with ethylene in the presence of a catalyst such as aluminum 8-chloro-N-ethyl-1-naphthyl amide. Still further examples of products that can be obtained by our process are 2-ethyl-6-tert-butyl aniline, 2,5-diethyl aniline, 2,3,6-triethyl aniline, 2-ethyl-5-chloro aniline, 2-ethyl-8-methyl-1-naphthyl amine, 2-ethyl - 3-chloro-5-methyl-N-ethyl aniline, 2-sec-butyl-N-ethyl aniline, 2-cyclohexyl-N-amyl aniline, and the like.

In carrying out the process of our invention the reagents can often be reacted without the presence of any diluent. However, it is within the scope of our invention to conduct the process of this invention with either or both of our reactants dissolved in one or more solvents or a mixture of solvents. The solvent or diluent can either be liquid, solid or gaseous at ordinary temperatures, depending primarily on the state of the reactant which is to be diluted at the time of introduction into the reaction vessel or zone. The solvent should be one which is inert to the components, including the catalyst, under the conditions of the reaction. Paraffins, cycloparaffins, aromatic hydrocarbons, and inert gases and the like, are examples of suitable solvent types which may be compatible with one or more of the reagents that can be used in practicing our invention. Specific examples of solvents include n-octane, isooctane, cyclohexane, benzene, alkyl benzenes, hydrogen, nitrogen, argon and the like. Also, one of the reacting components can be employed as a solvent as, for example, an excess of the amine that is being reacted may serve as a suitable diluent.

In the commercial production of the compounds of our invention it is particularly attractive to conduct the process in a continuous manner. This can be done by a variety of techniques such as passing the reactants together with the catalyst, either substantially pure or admixed with an inert carrier, through a reaction zone. The product stream can be hydrolyzed and purified by distillation in a continuous fractionation column. The continuous method for the production of the compounds of our invention can be carried out either in a "once through" manner or with recycling of reactants and products. In continuous and batch modifications of our invention, the reactants can be diluted with inert solvents as stated hereinabove as well as with gases such as propane, ethane, methane, nitrogen, helium, neon, and the like.

The process of this invention can also be employed to react aromatic amines with compounds bearing acetylenic type carbon-to-carbon unsaturation. That is, aromatic amines, of the type described hereinabove, can be reacted with hydrocarbons, amines and ethers possessing carbon-to-carbon triple bonds such as acetylene, propyne, butyne, heptyne, decyne, and the like, in the presence of an aluminum anilide-type catalyst.

The compounds that can be made by our process have a variety of uses such as antiknock agents in fuels for internal combustion engines. They are used as modifiers for plastics, as intermediates for the synthesis of dyes having enhanced oil solubility characteristics, as HCl scavengers in chlorine-containing polymers, and as antiseptics. They also find use in the manufacture of resins, varnishes, Bakelite and similar products. They are found beneficial in other practices such as improvement of discoloration, fatigue, cracking and other aspects of the rubber industry.

We claim:

1. A process for the selective nuclear alkylation of an aromatic amine having at least one hydrogen on a carbon atom ortho to an amino group and having at least one hydrogen atom on an amino nitrogen, said amine being selected from the class consisting of amines unsubstituted in the nucleus, amines having hydrocarbons substituents in the nucleus, amines having halogen substituents in the nucleus and amines having alkoxy substituents in the nucleus, which process comprises heating said amine with an olefin in the presence of an aluminum anilide catalyst, said reaction being carried out at temperatures of 50 to 500° C.

2. The process of claim 1 wherein said amine is a primary amine.

3. The process of claim 1 wherein said amine is a secondary amine.

4. The process of claim 1 wherein said olefin is ethylene.

5. The process of claim 1 wherein said amine is a primary amine and said olefin is ethylene.

6. The process of claim 1 wherein said amine is a secondary amine and said olefin is ethylene.

7. A process for the preparation of ortho-tert-butyl-aniline which comprises heating aniline with isobutylene in the presence of aluminum anilide catalyst at a temperature of 50 to 500° C.

8. A process for the preparation of 2-methyl-6-ethyl-aniline which comprises heating ortho-toluidine with ethylene in the presence of aluminum ortho-methyl anilide catalyst at a temperature of 50 to 500° C.

9. A process for the preparation of 2,6-diethylaniline which comprises heating aniline with ethylene in the presence of aluminum anilide catalyst at a temperature of 50 to 500° C.

10. A process for the preparation of N-ethyl-2-ethyl-aniline which comprises heating N-ethylaniline with ethylene in the presence of aluminum N-ethyl anilide catalyst at a temperature of 50 to 500° C.

11. A process for the preparation of N-methyl-2-isopropylaniline which comprises heating N-methylaniline with propylene in the presence of aluminum N-methyl anilide catalyst at a temperature of 50 to 500° C.

References Cited in the file of this patent

UNITED STATES PATENTS

| 1,280,940 | Andrews | Oct. 8, 1918 |
| 1,882,518 | Nicodemus | Oct. 11, 1932 |
| 1,908,190 | Schollkopf | May 9, 1933 |
| 2,021,567 | Muckenfuss | Nov. 19, 1935 |
| 2,115,884 | Schollkopf | May 3, 1938 |
| 2,311,531 | Fulton | Feb. 16, 1943 |
| 2,367,713 | Burawoy | Jan. 23, 1945 |

FOREIGN PATENTS

| 251,334 | Germany | Oct. 29, 1911 |

OTHER REFERENCES

Meerwein: Justus Liebig's Annalen der Chemie, vol. 455, pp. 227–53 (1927).

Newton: "Jour. Am. Chem. Soc." (1943), vol. 65, pp. 2434–9.

Gaudion et al.: "Chem. Abst." (1948), vol. 42, p. 2963.

Wessely et al.: "Monatsh" (1952), vol. 83, pp. 1253–73 (also Chem. Abst. 1953, vol. 47, pp. 9936–7).

Beilstein's Handbuch der Organischen Chemie, vol. 12, main vol., pp. 1150, 1160, 1162, 1174, 1175, 1177, 1180, 1182–83; 1st supp., pp. 498, 505, 506; second supp., pp. 642, 643, 646.